2,854,385
TREATMENT OF ACETIC ACID AND MIXTURES THEREOF

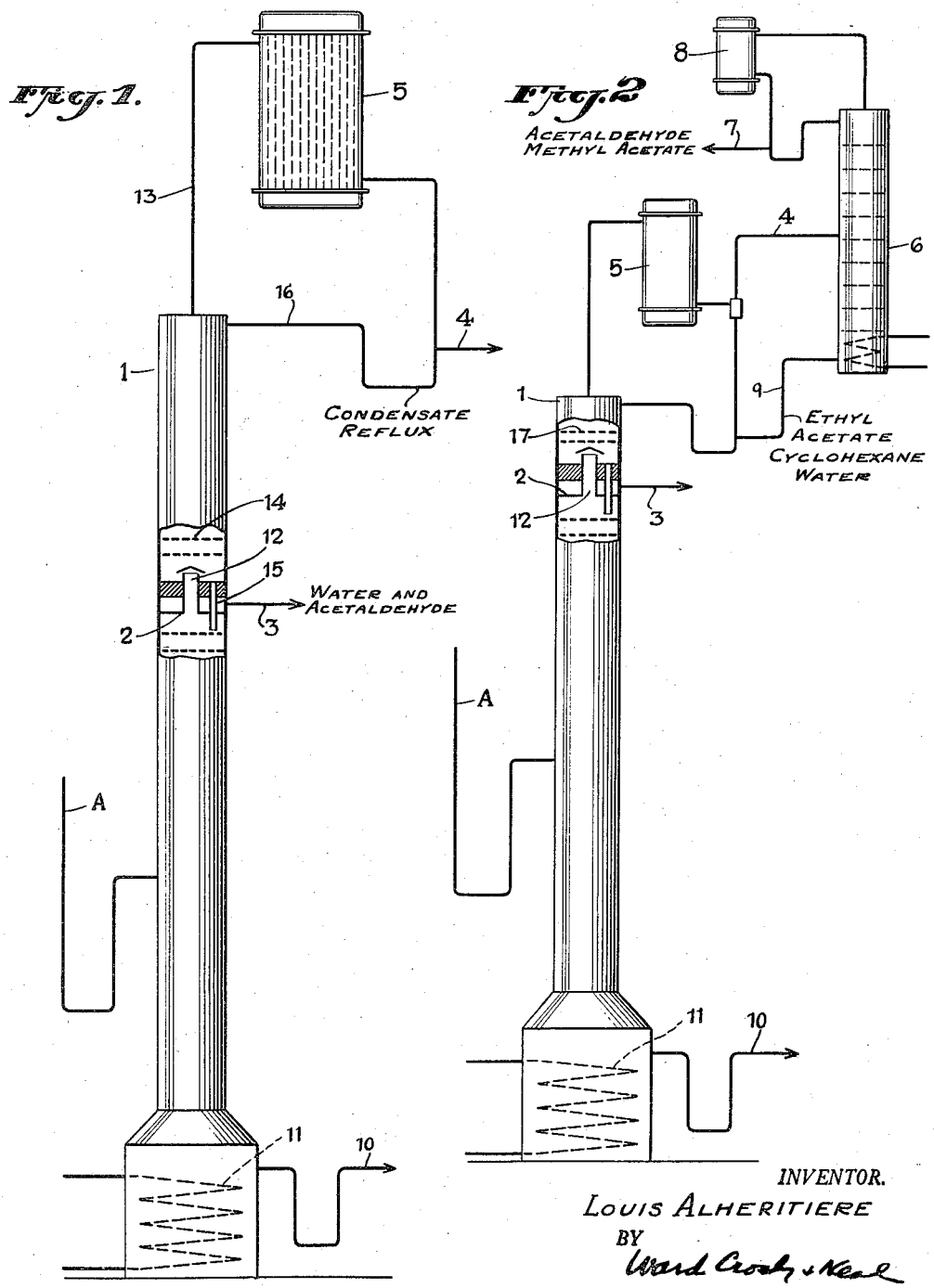

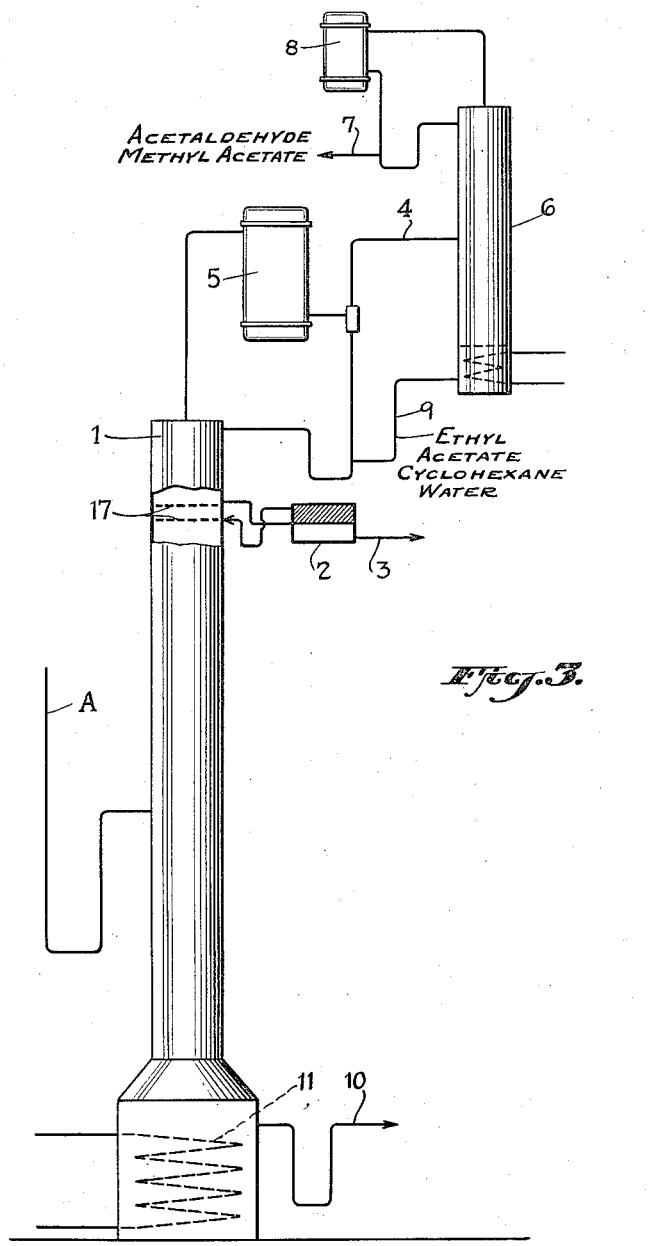

Louis Alhéritière, Melle, France, assignor to Les Usines de Melle (Societe Anonyme), Saint-Leger-les Melle, France, a corporation of France Application December 24, 1953, Serial No. 400,338

5 Claims. (Cl. 202—39.5)

This invention relates to a process for dehydrating aqueous compositions containing acetic acid with or without acetic acid anhydride. It is known that a low boiling ester, such as ethyl acetate, can be employed as a water-entrainer for dehydrating aqueous acetic acid or aqueous mixtures of acetic acid and acetic anhydride by azeotropic distillation.

However, an inconvenience of such method is that the low boiling esters employed, especially ethyl acetate, dissolve a relatively high proportion of water, so that the upper, entrainer layer from the decantation of the azeotrope contains rather high amounts of entrained water, which, through the refluxing process, is returned to the dehydration column, this being undesirable from the economic standpoint. Moreover, the presence of volatile impurities highly soluble in water, such as acetaldehyde, acetone and methyl acetate, which are always present in certain industrial acetic aqueous solutions as well as in the products from the pyrolysis of acetic acid, increases the water-solubility of the ester, thus preventing normal decantation of the azeotrope, so that the dehydration process rapidly becomes impossible.

An improvement intended to overcome the difficulty mentioned above is described in U. S. Patent No. 2,317,758 consisting in employing in a dehydration process, in addition to the ester entrainer, an auxiliary entrainer insoluble or substantially insoluble in water, for example a hydrocarbon or hydrocarbons, such as a petroleum cut or cyclohexane. The auxiliary entrainer is so chosen as to form with water an azeotropic mixture which is more volatile than the ester-water azeotropic mixture. In the patent the auxiliary entrainer is used in an amount so as to be present only in the head plates of the dehydration column and in the decanter while the ester is only present in an intermediate zone situated between the acid feed and the top zone containing the auxiliary entrainer. The ester prevents the acetic acid from rising to the top of the column.

The above-described improvement is efficient, where the mixture to be dehydrated contains but small amounts of acetaldehyde and acetone as is the case, for example, in mixtures obtained by pyrolysis of acetic acid at atmospheric pressure. By reason of the low proportion of these water-soluble impurities, for example about 0.5% acetaldehyde and 0.5% acetone, the ability thereof to promote formation of a homogeneous mixture is substantially balanced by the water-insolubility of the hydrocarbon entrainer, so that the decantation always takes place without difficulty and the water-soluble impurities are removed in the lower, aqueous layer. On the contrary, where the mixture to be dehydrated contains considerable proportions of acetaldehyde and other volatile, water-soluble impurities, as is the case, for example, in the acetic acid-acetic anhydride-water mixtures produced by oxidation of acetaldehyde by means of molecular oxygen, the above-described improvement becomes practically inefficient because, despite the presence of the hydrocarbon entrainer, the acetaldehyde which is entrained in large amounts in the azeotropic mixture practically prevents decantation as the mixture remains in homogeneous condition.

The principal object of the invention accordingly is to provide a simple, efficient process which shall substantially avoid the above-mentioned difficulties and which will permit decantation in all cases, even where mixtures containing high proportions of volatile water-soluble impurities are involved.

The invention accordingly comprises the novel processes and steps of processes, specific embodiments of which are described hereinafter by way of example and in accordance with which I now prefer to practice the invention.

I have found in accordance with my invention that if aqueous mixtures of acetic acid, with and without acetic anhydride, containing volatile water-soluble impurities, are distilled in a distilling column in the presence of water entrainers, it is possible to distill aqueous impurities and entrainer beyond the entrainer zone, above a quiescent liquid zone which is traversed without bubbling by the ascending vapors. Decantation takes place in said last-mentioned zone, producing a lower aqueous layer with some impurities therein, which is continuously withdrawn. The upper layer is refluxed into the entrainer zone and the remaining volatile water-soluble impurities are distilled into a zone above the quiescent zone and removed therefrom.

I may employ a single water entainer. Generally, however, I prefer to employ simultaneously two water entrainers, namely, a main water entrainer such as ethyl acetate, but without limitation, and an auxiliary water entrainer forming with water an aqueous azeotropic mixture which is more volatile than the azeotropic mixture of water with the main water entrainer, such as cyclohexane, as mentioned, or other hydrocarbon or mixture of hydrocarbons, the zone in which the auxiliary entrainer operates being situated above that of the main entrainer.

The quiescent zone may simply consist of a decanting plate of conventional type, said decanting plate being surmounted by a number of ordinary distilling plates for separation of volatile impurities.

In practice the number of ordinary distilling plates placed above the decanting plate should be at least 4, so that the total number of plates (including the decanting plate) added, according to this invention, to the hitherto employed dehydration colmns, is at least of the same order as the number of plates reserved for the auxiliary entrainer, if any. The arrangement causes the acetaldehyde and other volatile water-soluble impurities in the aqueous layer on the decantation plate always to be very low, usually below 2% by weight, so that the decantation process is not impeded and the dehydration operates under economical conditions.

For maintaining regularity of the distillation process, it is obviously necessary that the acetaldehyde and other like impurities be removed from the apparatus at a rate equal to that at which they are introduced thereinto.

If the additional distillation zone surmounting the decanting plate is long enough, the volatile impurities, acetaldehyde, methyl acetate, and acetone, can be obtained at the top of said zone, removed from the column and condensed, so that they are withdrawn without any loss of entrainer.

Another mode of operation consists in surmounting the decanting plate by only a few distilling plates, removing from the top of the column mixed vapors consisting of acetaldehyde and azeotropic mixture of water with entrainer or with auxiliary entrainer alone or with both main and auxiliary entrainers as the case may be, these vapors being distilled in a further auxiliary column to separate entrainer-free acetaldehyde therefrom.

The latter embodiment is particularly advantageous, because in the first case the number of distilling plates surmounting the decanting plate must be great and the condenser of the column must be of great volume to absorb all the calories furnished to the foot of the column, which are carried by vapors having a low dew point (21° C.). On the contrary, in the second case the auxiliary column for recovery of acetaldehyde and the condensers may be of small size, inasmuch as it is possible to operate the auxiliary column but not the distilling column under pressure. In that case, the auxiliary column is connected with the distilling column by means of conventional devices suitable for that purpose. Operating under pressure would be detrimental in the first case because the resulting temperature increase in the distillation column would accelerate hydrolysis of the anhydride where anhydride-containing aqueous mixtures are treated.

Though in the above description acetaldehyde has been taken as illustrative of the volatile, water-soluble impurities because acetaldehyde, in practice, is generally the main impurity in the industrial mixtures involved, it should be understood that this invention applies generally to the separation of any and all water-soluble substances having boiling points materially below that of the hydrocarbon-water (or hydrocarbon-ester-water) azeotropic mixture involved. Such substances, in particular acetone and methyl acetate besides acetaldehyde, which are present in considerable proportions in the starting mixture, act like acetaldehyde to interfere with decantation. Generally the above-mentioned, and other like substances, such as formaldehyde or methyl formate, are present in the acetic mixtures obtained by pyrolysis of acetic acid or by oxidation of acetaldehyde. In accordance with my invention they can be all removed in a highly efficient way.

EXAMPLES

The following are examples of the manner in which I now prefer to carry out the process of the invention. It is to be understood that these examples are illustrative of the process and the process is not to be considered as confined thereto except as indicated in the appended claims. In connection with these examples I refer to the attached drawings forming part of this application, in which Fig. 1 is a diagrammatic view of an apparatus which may be employed in carrying out the process of the invention; and Fig. 2 and Fig. 3 are modified apparatus which may also be used in carrying out the process of the invention.

*Example 1*

I introduced through feed pipe A into distilling zone, column 1 previously charged with 150 kg. of ethyl acetate and 20 kg. of cyclohexane, 100 kg. per hour of a mixture obtained by oxidation of acetaldehyde and having the following composition:

| | Percent by weight |
|---|---|
| Acetic anhydride | 57 |
| Acetic acid | 20 |
| Water | 10.2 |
| Acetaldehyde | 12.5 |
| Methyl acetate | 0.3 |

Referring now to Fig. 1, column 1 has distilling plates 14 above decanting zone on plate 2. There are fifteen such plates. To heat the column and plates therein, heat is applied through steam coil 11 or other suitable heating means. Acetic acid and acetic anhydride are prevented from rising beyond the entrainer zones. The ethyl acetate zone is below the cyclohexane zone and the portion free of acetic acid and acetic anhydride containing water, acetaldehyde and methyl acetate and the entrainers passes through the chimney 12 onto the distilling plates 14 without traversing the decanting zone. The water and 0.2 kg. per hour of acetaldehyde form a 2% aqueous solution of acetaldehyde which settles as a lower layer on plate 2 and is removed through pipe 3. The remainder of the acetaldehyde and all of the methyl acetate pass through pipe 13 to condenser 5. They are condensed and are removed from the system through pipe 4, a part thereof being refluxed through pipe 16.

The entrainers, refluxing from plates 14, collect as an upper layer on the decanting plate and separate from the dilute acetaldehyde-water solution and flow through pipe 15 into the cyclohexane zone.

Dehydrated acetic acid and acetic anhydride are removed through pipe 10.

If the above mixture were treated in accordance with the process of the above-mentioned U. S. Patent 2,317,758, decantation of the condensate would rapidly become impossible because the concentration of acetaldehyde with respect to the total, acetaldehyde plus water in the starting mixture is about 55%; consequently, for removing the acetaldehyde from the apparatus at a rate equal to its rate of introduction thereto, it would be necessary that the lower layer in the decanter contain, at the equilibrium, 55% of acetaldehyde. But the two layers become completely miscible with one another before the reaching of that concentration of acetaldehyde in the lower layer, rendering the process unworkable.

*Example 2*

Where only a few distilling plates are provided above the decanting device I remove from the top of the column mixed vapors of acetaldehyde and other volatiles with ethyl acetate and/or cyclohexane.

Referring to Fig. 2, the column 1 is supplied through feed pipe A with the entrainers in the quantities employed in Example 1, then with the acetic acid and other compounds of Example 1 in the same quantity. Column 1 has four distilling plates 17 above decanting plate 2. Heat was applied by coil 11 as in Example 1. Water, acetaldehyde and entrainers pass through chimney 12. A 2% acetaldehyde solution settles as a lower layer on decanting plate 2 and acetaldehyde is removed in this solution through pipe 3 at 0.2 kg. per hour. Cooling in dephlegmator 5 is so controlled that 27 kg. per hour of vapors pass through pipe 4 to auxiliary column 6, where they are distilled, these vapors containing the remaining 12.3 kg. of acetaldehyde and 0.3 kg. of methyl acetate, mixed with the ethyl acetate-cyclohexane-water azeotropic mixture. The impurities, acetaldehyde and methyl acetate, were withdrawn through pipe 7 after condensation in condenser 8. The ethyl acetate, cyclohexane and water were returned to column 1 through pipe 9.

As said above, column 6 may be operated under pressure, for example up to 1 kg. above atmospheric pressure, with a view of facilitating condensation of the vapors of volatile impurities, principally acetaldehyde, in condenser 8.

Dehydrated acetic acid and acetic anhydride containing no entrainer and free from impurities such as acetaldehyde and methyl acetate are obtained through pipe 10.

*Example 3*

Into the column of Example 1, previously charged with propyl acetate as a single entrainer, I introduced 100 kg. per hour of acetic acid solution recovered from hydrolysis of methyl acetate, containing:

| | Kg. |
|---|---|
| Acetic acid | 60 |
| Water | 35 |
| Methyl alcohol | 2 |
| Methyl acetate | 3 |

The operation was carried out as describe in Example 1. There was withdrawn in the lower layer from the decantation 0.4 kg. per hour of methyl alcohol and 0.1 kg. per hour of methyl acetate. 1.6 kg. per hour of methyl alcohol and 2.9 kg. per hour of methyl acetate were withdrawn from condenser 5 through pipe 4.

It is within the scope of our invention to substitute a distilling plate for decanting plate 2 and arrange outside column 1 a heat-insulated decanter receiving liquid from the distilling plate substituted for decanting plate 2, the upper layer from the decanter being returned to column 1 onto the plate situated just below said distilling plate, and the lower layer from the decanter being discarded. Such an arrangement combined with the apparatus of Fig. 2 is shown in Fig. 3.

*Example 4*

I introduced into the column 1 of Fig. 3, previously charged with isopropyl acetate as a main entrainer and benzene as an auxiliary entrainer, 100 kg. per hour of impure aqueous acetic solution containing:

| | Kg. |
|---|---|
| Acetic acid | 58 |
| Water | 29.8 |
| Acetaldehyde | 8 |
| Formaldehyde | 0.2 |
| Acetone | 4 |

The apparatus was operated substantially as that of Fig. 2.

0.1 kg. per hour of acetaldehyde, 0.2 kg. per hour of formaldehyde and 0.4 kg. per hour of acetone were withdrawn through pipe 3 in the lower layer from decanter 2.

7.9 kg. per hour of acetaldehyde and 3.6 kg. per hour of acetone were withdrawn from condenser 8 through pipe 7.

What I claim is:

1. The process for dehydrating and recovering impurities from mixtures selected from the group consisting of aqueous acetic acid, and aqueous mixtures of acetic acid and acetic anhydride, said mixtures containing large amounts of volatile water-soluble impurities, which comprises feeding the mixture and an entrainer into a distillation zone where a portion is vaporized, passing vapors of the water-soluble impurities, water and the entrainer onto distilling plates above a decantation zone within said distillation zone above the feed point which is heated by the column and which decantation zone is traversed without bubbling by said ascending vapors, said entrainer being an ester selected from the group consisting of ethyl acetate, propyl acetate and isopropyl acetate, refluxing the entrainer on said plates above the decantation zone into said decantation zone, allowing the liquid to separate so that a lower layer containing a minor proportion of impurities with water is formed in the decantation zone above which is a layer containing the entrainer, continuously withdrawing from the distillation zone the aqueous liquid with a minor amount of impurities, decanting the entrainer and returning it to the column below the decantation zone, and removing remaining water-soluble impurities from the system as a distillate from the top of the distillation zone substantially free of acetic material.

2. The process for dehydrating and recovering impurities from mixtures selected from the group consisting of aqueous acetic acid, and aqueous mixtures of acetic acid and acetic anhydride, said mixtures containing large amounts of volatile water-soluble impurities, which comprises feeding the mixture, a main water entrainer and an auxiliary water entrainer into a distillation zone where a portion is vaporized, passing vapors of the water-soluble impurities, water and said entrainers onto distilling plates above a decantation zone within said distillation zone above the feed point which is heated by the column and which decantation zone is traversed without bubbling by said ascending vapors, said main entrainer being selected from the group consisting of ethyl acetate, propyl acetate and isopropyl acetate, said auxiliary entrainer being one which forms with water an azeotropic mixture which is more volatile than the azeotropic mixture of water with the main water entrainer, refluxing the entrainers on said plates above the decantation zone into said decantation zone, allowing the liquid to separate so that a lower layer containing a minor proportion of impurities with water is formed in the decantation zone above which is a layer containing the entrainers, continuously withdrawing from the distillation zone the aqueous liquid with a minor amount of impurities, decanting the entrainers and returning them to the column below the decantation zone, and removing the remaining water-soluble impurities from the system as a distillate from the top of the distillation zone substantially free of acetic material.

3. A process as set forth in claim 1 wherein the acetic material to be purified and dehydrated contains at least one volatile water-soluble impurity selected from the group consisting of formaldehyde, acetaldehyde, methyl formate, methyl acetate, and methyl alcohol.

4. A process in accordance with claim 2, which comprises continuing the distillation beyond the decantation zone, in an upper zone the length of which is such that after condensation of the vapors the major part of the volatile impurities can be drawn off as a liquid free from entrainers and starting acetic material.

5. A process in accordance with claim 4, which comprises continuing the distillation beyond the decantation zone, in a short, upper zone, so that the vapors therefrom still contain entrainers and water, subjecting said head vapors to dephlegmation so as to liquefy a portion thereof, refluxing said liquefied portion to the top of the column, distilling the remainder of said head vapors in an auxiliary column, withdrawing from the top of said auxiliary column volatile water-soluble impurities free from water, entrainers and starting acetic material, and refluxing the liquid obtained at the base of said auxiliary column to the top of the first column together with said liquefied portion of the head vapors thereof.

References Cited in the file of this patent
UNITED STATES PATENTS

| 2,194,851 | Guinot | Mar. 26, 1940 |
| 2,317,758 | Guinot | Apr. 27, 1943 |
| 2,438,300 | Schnipp | Mar. 23, 1948 |